Patented Apr. 5, 1938

2,113,185

UNITED STATES PATENT OFFICE 2,113,185

METHOD OF MANUFACTURING, GRINDING, AND POLISHING BODIES

Rudolf Thilenius, Frankfort-on-the-Main, and Josef Schneider, Oberursel, Germany, assignors to the firm of Deutsche Gold-und Silber-Scheideanstalt vormals Roessler, Frankfort-on-the-Main, Germany, a corporation of Germany No Drawing. Application November 6, 1934, Serial No. 751,786. In Germany November 7, 1933

1 Claim. (Cl. 51—278)

This invention relates to the manufacture of grinding, polishing and abrasive bodies which are permeated with artificially produced cavities and, therefore, have a cellular or sponge-like structure, and are made of abrasive material, for example corundum, silicon carbide, emery, powdered glass and the like with the use, as binding agents, of artificial resins, for example phenol resins of a phthalic acid basis, urea resins, formaldehyde resins and the like.

The manufacture of grinding and abrading bodies of the aforesaid type with the use of artificial resins as the binding agent gives rise to some difficulty because the grinding body must be heated in order to effect solidification. During this heating there is a danger that the resin may become so soft or even liquid that the gas contained in the cavities can escape, so that the cellular or spongy structure is destroyed.

According to the invention, this difficulty is obviated by employing as the binding agent artificial resins which have been converted by a suitable pretreatment, for example by heating or in some cases by storing them for a time at the ordinary temperature, into a condition which enables the grinding bodies to be heated to the temperature necessary to effect the solidification without any considerable or undesirable softening or liquefaction of the resin or mixture of resins taking place. The reason why the resins attain this condition is in general probably due to polymerization or condensation processes or both which take place. In some cases these processes can be accelerated or favourably influenced by the addition of assistants, for example catalysts.

The resins can be subjected to the "thickening" pretreatment either alone or in mixture with the abrasive material or a portion thereof.

The production of the cellular or sponge-like structure can be effected, for example, by incorporating in the mixture of abrasive material and binding medium substances which are capable of developing gas bubbles. In some cases the development of the gas bubbles can be effected or assisted by the addition of auxiliary agents, for example catalysts. In carrying out the present process the substances which have proved especially suitable are those which decompose at an elevated temperature with the evolution of gas, for example carbonates or bicarbonates of the alkali metals, of ammonium and of the amines, urea peroxide and so forth. For promoting the decomposition of substances such as urea peroxide and the like, catalysts, for example manganese dioxide, can be added.

The amount of the substance which is added for the purpose of producing the loosening of the structure may vary within considerable limits. In some cases extremely small quantities, for example a few hundredths percent or even less are sufficient. Thus it has been found that it may be sufficient to produce in the mass a number of minute bubbles which then act as it were as seed bubbles for the gases or vapours which are developed.

In carrying out the invention the procedure may for example be as follows: The artificial resin is thoroughly mixed, for example in a liquid or pasty form, with the necessary quantity of grains of abrasive material and the mixture is exposed for some time to the action of an elevated temperature. In the case of the phenol-formaldehyde resins, which are known under the registered trade-mark "Bakelite", temperatures of about 50 to 160° C. have proved to be suitable. The duration of the heat treatment is dependent on the temperature. When high temperatures are employed, a few hours is sufficient, but if the mixture is heated at a lower temperature then the duration of heating must be longer. By making use of suitable expedients, such as for example varying the pressure, the temperature which is favourable for the preliminary condensation can in some cases be varied and the condensation process can thereby be influenced in various directions, for example it can be shortened. An agent which is capable of giving off gas bubbles is then incorporated as uniformly as possible with the pretreated mixture preferably after it has cooled down completely. This agent can be incorporated in a state of extremely fine subdivision but it may also be incorporated in a coarser form which is suitable for the formation of larger bubbles. The mixture is then converted into bodies of the desired shape, for example into the shape of grinding discs, and is heated preferably in the mould to the temperature suitable for producing solidification. For this purpose the temperature is allowed to rise gradually, for example from about 50–60° C. to about 100–120° C. When the body has become sufficiently tough owing to this gradual heating, it can be heated still further. The final hardening then takes place at a temperature which is dependent on the kind of resin employed. In the case of bakelite for example the final hardening can take place at a temperature of 180° C.

When carrying out the process in accordance with the invention the abrasive mass maintains its cellular or honey-combed structure while being heated and no damage to the internal structure or any collapse thereof need be feared.

According to one method of carrying the invention into effect, a mixture of grains of abrasive material and the pretreated resinous binding material with the addition of quite small quantities of a gas producing agent, for example ammonium carbonate, is heated at an elevated temperature and, after the volume has increased to the desired extent owing to the evolution of the gas bubbles, the mass is subjected to pressure and is further heated, the temperature being suitably regulated. After the evolution of gas or vapour has ceased and the mass has become sufficiently tough, it can be brought to the higher temperature necessary to produce the final solidification without any damage to or collapse of the internal structure occurring.

If the artificial resin which is to be employed as the binding agent is solid or dry at the ordinary temperature, then a gas-producing agent which only decomposes at an elevated temperature, for example at the temperature at which the binding agent becomes plastic, is preferably employed.

It has been found also that in some cases the addition of substances which evolve gas may be dispensed with. In this case the procedure may for example be as follows: The pretreated resinous binding agent is mixed with the necessary quantity of grains of abrasive material or a mixture of the resin and grains of abrasive material is subjected to the thickening pretreatment and the mixed mass, after being converted into the desired shape, is heated with the application of pressure and is then solidified as previously described at a high temperature. By this means grinding bodies having a loose, for example, cellular or honeycombed structure, can also be obtained.

By suitably selecting the working conditions, for example as regards the amount of abrasive material, the kind and quantity of the gas producing or loosening agent and so forth, it is possible to regulate as desired the degree to which the structure of the abrasive mass is loosened. By the addition of relatively large amounts of binding medium and by using moulds which allow the desired increase in volume to take place, grinding bodies can be made of which the apparent density is for example 0.2 or less. Grinding bodies of such low apparent density have very great strength and can be driven at peripheral speeds of rotation which could not hitherto be employed with solid grinding discs owing to the danger of splitting. Bodies manufactured in accordance with the invention can also be advantageously employed as polishing bodies if a suitably fine-grained abrasive material is used in their manufacture.

The mixtures which are to be made into the grinding bodies may for example be made by working the grains of abrasive material into the warm artificial resin and incorporating the gas-producing agent in the mixture after it has cooled. Instead of this, a gas-producing agent may be employed which only gives off gas at an elevated temperature, for example at a temperature above 100° C., and this agent is worked into the heated resin, if desired together with the grains of abrasive material, at a temperature at which evolution of gas does not occur. A further method of procedure is to make an intimate mixture of cold resin, grains of abrasive material and gas-producing agent.

The invention is hereinafter more particularly explained with the aid of examples, in which an artificial resin which has been pretreated in the following manner is employed in the manufacture of the grinding bodies.

300 grams of bakelite are heated for some hours to a temperature of about 150° C. The progress of the condensation is tested by taking samples and the heating is interrupted when the samples of the resin can be drawn into the form of long threads at room temperature.

*Examples*

1. 30 grams of the pre-condensed bakelite are intimately mixed with 1.0 gram ammonium carbonate and 70 grams silicon carbide (grain No. 80). The volume of the mixture is about 55 cc. and the mixture is introduced into a mould having a volume of about 82 cc. and which can be closed. The upper part of the mould is provided with small openings which allow any air and superfluous gas which may be present in the mould after the introduction of the mixture to escape but do not allow the mass to escape from the closed mould. The mould charged with the mixture is heated in an oven to a temperature of 120–140° C., whereby, owing to the evolution of gas which occurs, the air is displaced and the mass is permeated with the bubbles. The removal from the mould may take place in general after 1 to 3 hours. The grinding body obtained has a porous or cellular structure.

The increase in volume is about 50%. The volume of the cavities in the finished grinding body is about 30% of the total volume.

2. 30 grams of the pre-condensed artificial resin, 0.1 gram ammonium carbonate and 40 grams silicon carbide (grain No. 400) are intimately mixed and introduced into a mould, the volume of which is 150% greater than the volume of the mass introduced. By treating the mixture in accordance with the Example 1 there is obtained a grinding body in which the volume of the cavities amounts to about 60% of the total volume.

3. 25 grams of pre-condensed artificial resin are intimately mixed with 0.25 gram ammonium carbonate and 13 grams silicon carbide (grain No. 400) and introduced into an open mould of which the volume is about 190 cc. It is heated for about 15 hours at a temperature of about 50 to 60° C. during which little permeation by gas bubbles occurs. After this the temperature is gradually raised during a period of 2 hours to about 100° C. The main permeation by gas bubbles takes place during this period. After this the temperature is again gradually raised, care being taken that the evolution of gas is retarded at the desired moment, for example on emptying the mould. It has been found that the method can be carried out in such a manner that the progressive condensation of the resin and the solidification connected therewith tend to prevent a further permeation of the mass by bubbles beyond the extent desired. After the grinding body has become sufficiently solid it is heated to a temperature suitable to produce complete solidification. The grinding body obtained has an apparent density of about 0.2.

We claim:

A process for the manufacture of abrasive bodies having artificially produced voids from abrasive materials and synthetic resin binders which comprises the steps of mixing the abrasive granules and a resinous binding medium which will develop gas upon heating, subjecting the mixture to treatment whereby the softening point of the resin is elevated, placing said mixture in a closed mold which permits the escape of gas and air but from which said mixture cannot escape, heating said mixture in order to develop gas therein and to substantially fill said mold, and then further heating the resulting product until solidification occurs.

RUDOLF THILENIUS.
JOSEF SCHNEIDER.